Patented Oct. 31, 1950

2,527,693

UNITED STATES PATENT OFFICE 2,527,693

SOFT GLASS HAVING WIDE WORKING RANGE

William H. Armistead, Corning, N. Y., assignor to Corning Glass Works, Corning, N. Y., a corporation of New York No Drawing. Application November 20, 1946, Serial No. 711,201

3 Claims. (Cl. 106—52)

This invention relates to compositions for glasses having special characteristics fitting them for a variety of purposes such as the manufacture of tubes and bulbs and their subsequent fabrication into electric sign lights, cathode ray tubes and the like. Such purposes require a thermal expansion coefficient in the neighborhood of $90 \times 10^{-7}$ cm. per cm. per degree C., a moderately low softening point, a wide working range, a high electrical resistivity, good chemical and physical durability, low specific gravity and low batch cost for large tonnage production.

By working range is meant the temperature interval through which the glass is sufficiently plastic for working. The length of the working range is dependent upon the rate at which the viscosity of the glass changes with temperature throughout this range and the more slowly the viscosity changes the longer will be the working range. The rate of change of viscosity in the working range for most glasses is sufficiently uniform so that the difference between the temperatures for two given viscosities of a glass affords a convenient measure of such rate for comparative purposes.

Two temperatures which may be determined for any glass by methods well known in the art and which have come to be standard in reference to the physical properties of glasses are the softening point at which the logarithm of the viscosity in poises is approximately 7.65 and the strain point at which the logarithm of the viscosity is approximately 14.6. Otherwise defined, the softening point of a glass is that temperature at which a thread of the glass .55–.75 millimeter in diameter and 23 centimeters long will elongate under its own weight at the rate of one millimeter per minute when heated throughout the upper 10–15 centimeters of its length. The strain point is that temperature below which appreciable permanent strain cannot be established nor removed through plastic flow, and it is measured preferably by the method described by H. R. Lillie in the Journal of the American Ceramic Society, vol. 14, page 505 (1931) in an article entitled "Viscosity of Glass between the Strain Point and Melting Temperature."

A softening point between 610° and 720° C. and and a working temperature range of 215° C. or more are desirable in order to facilitate the flame working of the glass and the sealing of metal parts thereto during its fabrication into illuminating devices, cathode ray tubes, etc.

A thermal expansion coefficient around $90 \times 10^{-7}$ cm. per cm, per degree C. has become a required property for glasses to be used for these purposes in order to match the expansion coefficients of the various metal alloys which have been developed for making the glass-to-metal seals.

For some purposes, such as the production of cathode ray tubes, a glass having an electrical resistivity of at least $100 \times 10^5$ ohm cm. at 350° C. is required.

Needless to say, the glass must be resistant to weathering and the attack of chemical reagents and to devitrification during flame working. From the standpoint of economy, a low specific gravity and a low batch cost are essential.

Lead glasses or glasses of the type

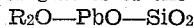
$R_2O$—$PbO$—$SiO_2$ possess some of the above described properties and have heretofore been employed for the purposes set forth. However, as a result of the recent war, lead-containing batch materials have become scarce and expensive and the need for glasses having the same or better properties but containing little or no lead is very pressing. Lead glasses in general have objectionably high specific gravities and in this and other respects improvement is desired.

Glasses of the soda-lime-silica type also possess some of the desired properties but have too short a working range and are too low in electrical resistivity, not over $2 \times 10^5$ ohm cm. at 350° C. for the present purposes.

Prior soda-alumina-silica glasses in general are too hard or have too high softening points, have too low expansion coefficients and are too low in electrical resistivity.

Thus it will be seen that prior glasses, which have a sufficient long working range for the present purposes, do not at the same time possess all of the other necessary properties.

The object of this invention is to provide glasses which have all of the above described desirable properties and which are particularly suitable for the purposes set forth.

A specific object is to provide a glass having a working range greater than 215° C.; a softening point less than 720° C., an electrical resistivity greater than $2 \times 10^5$ ohm cm., an expansion coefficient between $80 \times 10^{-7}$ and $100 \times 10^{-7}$ cm. per cm. per degree C., a specific gravity less than 3, good chemical and physical stability and substantial freedom from lead oxide.

I have found that the above and other objects may be attained with a composition at least 94% of which consists of 53% to 75% $SiO_2$, 3% to 15% $Al_2O_3$, .1% to 13% $K_2O$, .1% to 17% $Na_2O$, .5% to 2% $Li_2O$, 0% to 28% $BaO$, and .5% to 2.5% F, the total percentage of alkali metal oxides being between 15% minus one-third the percentage of $BaO$ and 20% minus one-third the percentage of $BaO$. Preferably, the glass contains at least 3% $BaO$ and the total percentage of alkali metal oxides is between 16 minus ⅓ the percentage of $BaO$ and 19 minus ⅓ the percentage of $BaO$. In addition to the above named constituents the glass may, if desired, contain up to 6% of other oxides, such as $PbO$ and oxides of metals of the second periodic group other than barium, without impairing its properties and without seriously increasing its cost and specific gravity.

As an important distinguishing feature of the new glasses it is to be noted that they contain lithia, fluorine and alumina. It is known that both lithia and fluorine lower the softening point of glass, but previous experience indicates that they also shorten its working range, that is, they do not at the same time lower the strain point proportionately with the softening point. Alumina, on the contrary, ordinarily raises the softening point but lengthens the working range by not raising the strain point proportionately. I have now found that in the new glasses the combination of lithia, fluorine and alumina not only lowers the softening point but also unexpectedly lowers the strain point proportionately with the softening point.

As an illustration but not a limitation of the invention, the following compositions are given in percent by weight as calculated from the respective batches on the customary oxide basis:

|  | 1 | 2 | 3 | 4 | 5 | 6 | 7 | 8 | 9 | 10 |
|---|---|---|---|---|---|---|---|---|---|---|
| $SiO_2$ | 71.7 | 71.7 | 69.7 | 68.5 | 70.1 | 66.5 | 63.3 | 59.3 | 58 | 70.4 |
| $Al_2O_3$ | 8.4 | 8.4 | 10.4 | 8.4 | 8.4 | 7.5 | 6.7 | 6.7 | 7 | 7.5 |
| $K_2O$ | 2.6 | 6.6 | 4.6 | 4.6 | 2.1 | 2.5 | 6.6 | 8.6 | 8 | 2.5 |
| $Na_2O$ | 14 | 10 | 12 | 11.2 | 13.7 | 11.5 | 5.7 | 1.7 | 3.5 | 14.5 |
| $Li_2O$ | 1.3 | 1.3 | 1.3 | 1.3 | 1.0 | 1 | 1.0 | 1.0 | 1 | 1.1 |
| F | 2 | 2 | 2 | 2 | 1.7 | 2 | 1.7 | 1.7 | 1.5 | ,2 |
| ZnO |  |  |  | 4 |  |  |  |  |  |  |
| BaO |  |  |  |  | 3 | 9 | 15 | 21 | 18 |  |
| CaO |  |  |  |  |  |  |  |  | 3 |  |
| $B_2O_3$ |  |  |  |  |  |  |  |  |  | 2 |
| Softening Point, °C | 623 | 646 | 638 | 637 | 632 | 628 | 652 | 690 | 692 | 631 |
| Strain Point, °C | 386 | 395 | 401 | 409 | 395 | 401 | 415 | 452 | 460 | 404 |
| Soft.-Str | 237 | 251 | 237 | 228 | 237 | 227 | 237 | 238 | 232 | 227 |
| $Exp. \times 10^7$ | 92.8 | 91.0 | 91.6 | 90.2 | 91.1 | 91.3 | 90.3 | 87.0 | 89.2 | 89.6 |
| Sp. Gr. | 2.41 |  |  |  |  | 2.56 | 2.65 |  | 2.75 | 2.41 |
| Ohm cm.$\times 10^{-5}$ @ 350° C | 1.5 | 11 | 4 | 6 | 2 | 6.6 | 170 | 1,930 | 1,480 | 2 |
| Stability | .07 |  |  |  |  | .15 | .18 |  | .17 |  |
| Batch Cost in cents per lb. of glass | 1.7 |  |  |  |  | 2.0 | 2.6 |  | 2.7 | 1.7 |

Some fluorine may be lost from the above glasses during melting of their batches. However, at least .5% of fluorine will remain in the glass and may be determined by analysis. For example, glass No. 6 after melting contained .94 part of fluorine per 100 parts by weight of glass as determined by analysis.

In the above table of examples it will be noted that in each case the working range as measured by the difference between the softening point and the strain point exceeds 226° C. In some instances it may exceed 250° C. or more. For some purposes, as for rapid mechanical production, it may be desirable to restrain the working range and to maintain it below its maximum. This may be accomplished by the introduction of small amounts of certain oxides which have a shortening effect, such as MgO, CaO, ZnO, $B_2O_3$, and $TiO_2$. Not more than 6% of any one or a combination of these oxides is required. The use of ZnO, CaO, and $B_2O_3$ for this purpose is illustrated in compositions 4, 9 and 10 respectively.

In the table, the stability is expressed as the weight in milligrams per square centimeter of the surface of the glass which is lost when a sample of the glass is immersed in boiling fiftieth normal $Na_2CO_3$ for six hours, and is determined by weighing the sample before and after treatment with the boiling $Na_2CO_3$. The lower this result the better the stability of the glass for the intended purposes. For comparison, it may be said that the corresponding stability of common soda lime glass is about .25 and that for the prior lead glasses is about .25 to .40. Thus it will be seen that the new glasses, according to this test, are generally better than these prior glasses.

Glasses 6 and 10 are particularly suitable for the production of tubing for electrical discharge devices and glass 9 is particularly suitable for use in the manufacture of cathode ray tubes for which a high electrical resistivity is required.

As a cheap source of lithia, I have found it advantageous to employ lepidolite in the batches of the new glasses and it will be noted that their cost per pound of glass does not exceed about 3¢. In comparison, the batch cost of lead glasses is about 3.5¢ to 5¢ per pound of glass.

I claim:

1. A transparent glass which consists of 53% to 75% $SiO_2$, 3% to 15% $Al_2O_3$, 0.1% to 13% $K_2O$, 0.1% to 17% $Na_2O$, 0.5% to $Li_2O$, 3% to 28% BaO and 0.5% to 2.5% F, the total percentage of the alkali metal oxides being between 16% minus one-third the percentage of BaO and 19% minus one-third the percentage of BaO, the expansion coefficient of the glass being between $80 \times 10^{-7}$ and $100 \times 10^{-7}$ cm. per cm. per degree C. the difference between the strain point and the softening point of the glass being over 215° C., the softening point being less than 720° C. and the electrical resistivity being greater than $2 \times 10^5$ ohm cm.

2. A transparent glass which has the approximate composition in percent by weight 66.5 $SiO_2$, 7.5 $Al_2O_3$, 2.5 $K_2O$, 11.5 $Na_2O$, 1 $Li_2O$, 9 BaO and 2F.

3. A transparent glass consisting of 53% to 75% $SiO_2$, 3% to 15% $Al_2O_3$, 0.1% to 13% $K_2O$, 0.1% to 17% $Na_2O$, 0.5% to 2% $Li_2O$, up to 28% BaO, and 0.5% to 2.5% F, the total percentage of the alkali metal oxides being between 15% minus one-third the percentage of BaO and 20% minus one-third the percentage of BaO, the softening point of the glass being less than 720° C., the difference between the strain point and the softening point being over 215° C., the expansion coefficient being between $80 \times 10^{-7}$ and $100 \times 10^{-7}$ cm. per cm. per degree C., and the electrical resistivity being greater than $2 \times 10^5$ ohm cm.

WILLIAM H. ARMISTEAD.

REFERENCES CITED

The following references are of record in the file of this patent:

UNITED STATES PATENTS

| Number | Name | Date |
|---|---|---|
| 2,392,314 | Dalton | Jan. 8, 1946 |

FOREIGN PATENTS

| Number | Country | Date |
|---|---|---|
| 870,982 | France | 1942 |

Certificate of Correction

Patent No. 2,527,693 October 31, 1950

WILLIAM H. ARMISTEAD

It is hereby certified that error appears in the printed specification of the above numbered patent requiring correction as follows:

Column 2, line 31, for "sufficient" read *sufficiently*; column 4, line 17, for "to Li$_2$O" read *to 2% Li$_2$O*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*